United States Patent
Hagner

(10) Patent No.: US 8,547,018 B2
(45) Date of Patent: Oct. 1, 2013

(54) CONTROL SYSTEM FOR VEHICLE HEADLIGHTS

(75) Inventor: Thorsten Hagner, Ilvesheim (DE)

(73) Assignee: Deere & Company, Moline, IL (US)

( * ) Notice: Subject to any disclaimer, the term of this patent is extended or adjusted under 35 U.S.C. 154(b) by 275 days.

(21) Appl. No.: 13/185,963

(22) Filed: Jul. 19, 2011

(65) Prior Publication Data

US 2012/0032594 A1    Feb. 9, 2012

(30) Foreign Application Priority Data

Aug. 3, 2010 (DE) .......... 10 2010 038 841

(51) Int. Cl.
*B60Q 1/02* (2006.01)

(52) U.S. Cl.
USPC ........... 315/82; 315/77; 362/466; 362/465; 362/475; 362/507; 701/25; 701/26

(58) Field of Classification Search
USPC ......... 362/464–469, 475, 507, 514; 315/77, 315/80, 82; 701/25, 26, 36
See application file for complete search history.

(56) References Cited

U.S. PATENT DOCUMENTS

| | | | |
|---|---|---|---|
| 5,202,668 A * | 4/1993 | Nagami ............ | 345/7 |
| 5,442,527 A | 8/1995 | Wichelt | |
| 7,604,383 B2 | 10/2009 | Lambert et al. | |
| 7,611,266 B2 | 11/2009 | Ibrahim et al. | |
| 7,717,592 B2 * | 5/2010 | Tyll et al. ............ | 362/464 |
| 8,344,864 B1 * | 1/2013 | Al-Mutawa ............ | 340/435 |
| 2009/0140887 A1 * | 6/2009 | Breed et al. ............ | 340/990 |
| 2009/0167188 A1 | 7/2009 | Mueller et al. | |
| 2012/0310465 A1 * | 12/2012 | Boatright et al. ........ | 701/25 |

FOREIGN PATENT DOCUMENTS

| | | |
|---|---|---|
| DE | 10342592 | 4/2005 |
| DE | 102006022022 | 9/2007 |
| EP | 2158799 | 3/2010 |

OTHER PUBLICATIONS

European Search report (5 pages).
German Search Report (4 pages).

* cited by examiner

*Primary Examiner* — Haiss Philogene

(57) ABSTRACT

A control system for vehicle headlights includes a navigation device and a control unit which controls the illumination characteristics of the headlights depending on geographic location information received by the navigation device. The illumination characteristics are adapted in compliance with predefined illumination settings if the acquired geographic location information shows that the vehicle headlights are being operated on public roads. The illumination characteristics are adapted with further consideration of illumination settings specified by the driver if the location information shows that the vehicle headlights are being operated on non-public roads.

10 Claims, 1 Drawing Sheet

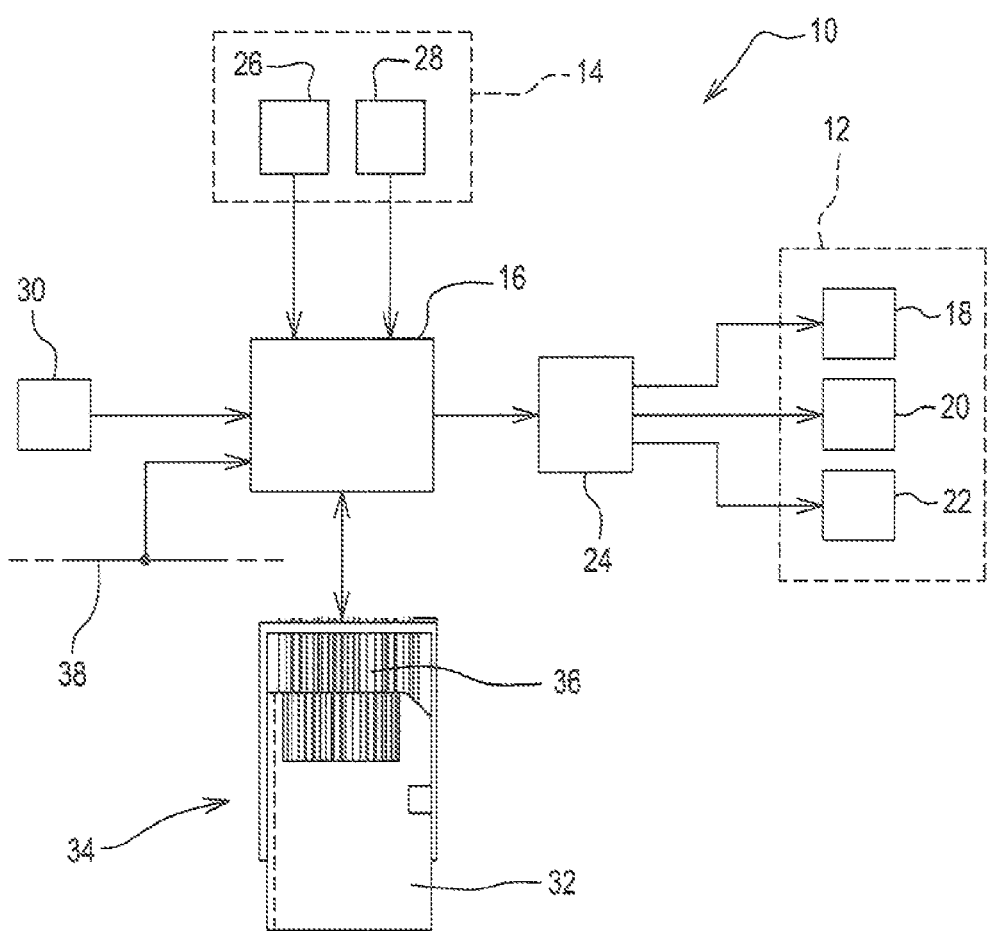

CONTROL SYSTEM FOR VEHICLE HEADLIGHTS

FIELD OF THE INVENTION

The present disclosure relates to a control system for controlling vehicle headlights as a function of geographic location information received by a navigation device.

BACKGROUND OF THE INVENTION

Published US patent application No. 2009/0167188 describes, without any drawings, a system and method for controlling the light function of a front headlight in a road vehicle. This system includes a control element for controlling the function and a computer unit which determines the type of road being driven on and/or its course by matching location information acquired by means of sensors with data of a digital map and automatically adapts the light function to the determined road type and/or its course by suitably actuating the control element. Consequently, the driver no longer has to manually adjust the light function at least while driving on public roads. Further assistance for the driver on non-public roads is not provided.

It is desired to provide such a control system which is able to further assist a driver on non-public roads.

SUMMARY

According to an aspect of the present disclosure, a control system for vehicle headlights includes a navigation device for acquiring geographic location information and a control unit for adapting the illumination characteristics of the vehicle headlights depending on the acquired geographic location information. The illumination characteristics are adapted in compliance with predefined illumination settings if the acquired geographic location information shows that the vehicle is being operated on public roads. The illumination characteristics are further adapted in response to illumination settings specified by the driver if the acquired location information shows that the vehicle is being operated on non-public roads.

The compulsory and, in this respect, predefined illumination settings for operation on public roads result from pertinent legal stipulations, wherein the road traffic regulations effective in Germany (StVO), as well as the ECE regulations (ECE—Economic Commission for Europe) to be observed with respect to the technical design of the vehicle headlights, are particularly important in this context. When the driver changes from public roads to non-public roads and the control unit detects this change by evaluating the geographic location information acquired by means of the navigation device, the adaptation of the illumination characteristics of the vehicle headlights is no longer subject to such regulations. In fact, the adaptation of the illumination characteristics can take place—if so desired by the driver—exclusively or additionally with further consideration of the illumination settings specified by the driver in this case.

The vehicle headlights preferably include road lighting, field lighting and/or work lighting. The road lighting, the field lighting and/or the work lighting may be realized with one or more independent headlight groups. It would be possible, in particular, that the road lighting consists of an arrangement of several front headlights in the front region of a vehicle hood or an arrangement of auxiliary headlights that are arranged offset relative to the front headlights in the roof region of the driver's cab while the field lighting and/or the work lighting consist of a plurality of work lights that are distributed over the outer region of the vehicle body or the driver's cab. The utilization of auxiliary headlights is required, in particular, if the front headlight system forms part of an agricultural utility vehicle and the front headlights arranged in the front region of the vehicle hood are covered by front-mounted implements or the like.

A luminosity control, a light pattern control and/or a light color control may be provided in order to adapt the illumination characteristics of the vehicle headlights. The headlights of the vehicle headlights may specifically be equipped with conventional halogen, xenon and/or LED lamps used in vehicles, wherein the illumination characteristics of said lamps with respect to luminosity, light distribution and/or light color can be varied by means of a control element that is actuated by the control unit. The control element consists, for example, of an electric output regulator, an electrically adjustable screen or mirror arrangement or an electromechanical actuator for influencing the headlight orientation. In this respect, it would be conceivable to arrange the headlights and the lamps in a spatially separated fashion, wherein the light generated by the lamps is fed to the different headlights by means of optical waveguides.

The navigation device may furthermore feature a GPS receiver and a map memory, wherein the latter contains digitized road or terrain information. In this case, it can be determined whether the vehicle headlights is being operated on public roads or on non-public roads by matching the geographic location information acquired by means of the GPS receiver or the vehicle position resulting thereof with the road or terrain information contained in the map memory.

In this case, the predefined illumination settings may be characterized by a road type that is derived from the acquired geographic location information and/or a course of the road that is derived from the acquired geographic location information. If the control unit detects that the vehicle headlights is being operated impermissibly with the high beams switched on within a built-up area, for example, based on the road type being driven on, the vehicle headlights can be automatically dimmed by adapting the illumination characteristics accordingly. This applies similarly to the instance of driving through curves resulting from the current course of the road, wherein the illumination of the road lying ahead automatically follows the curvature of the curve due to a corresponding adaptation of the illumination characteristics in order to achieve an adaptive curve light.

An operating device may be arranged in the driver's cab in order to enable the driver to specify the illumination settings. The operating device may consist, for example, of touch-sensitive screen, a digital multifunctional button for navigating within a menu-based user interface or an arrangement of conventional electromechanical control elements such as switches, buttons or rotary actuators.

The control unit preferably stores the illumination settings specified by the driver in a memory unit such as a memory card at the instigation of the driver. The memory card is a re-writable flash memory that communicates with the control unit via a reversible interface that may simply consist of an electric plug connection. The reversible interface makes it possible to remove the memory card from the control system and to replace the memory card with another memory card. In other words, an individual memory card may be assigned to each driver in order to manage the driver's individual illumination settings. The flash memory typically consists of a Multimedia Card (MMC), a Secure Digital Memory Card (SD), a micro Secure Digital Memory Card (micro SD) or a Memory Stick (MS), wherein the latter can be connected to the control unit via a Universal Serial Bus (USB).

When using the control system in an agricultural utility vehicle, the illumination settings specified by the driver may concern different agriculture-related illumination scenarios, like those that occur, for example, while driving on field paths and farm roads, carrying out loading and unloading tasks on a farmstead, coupling and decoupling mounted implements, carrying out field and forest tasks or the like. For this purpose, the illumination settings specified by the driver for each illumination scenario can be stored in the memory unit together with a location marker that reflects a vehicle position derived from the acquired geographic location information. When the vehicle (once again) reaches the respective vehicle position, the control unit subsequently retrieves the stored illumination settings from the memory unit automatically—or after prior acknowledgment by the driver—and uses these illumination settings for automatically adapting the illumination characteristics of the vehicle headlights. It would additionally or alternatively also be possible to store a time marker, wherein this time marker reflects a time of day that is specified by the driver and at which the illumination settings specified by the driver should be retrievable.

In other words, the illumination settings specified by the driver may be characterized by a position an/or time marker that is/are set by the driver for desired illumination characteristics.

It would furthermore be conceivable to store an illumination setting specified for a certain work function of the agricultural utility vehicle in the memory unit. The work function may be linked, for example, to the utilization of a certain mounted implement. In this case, the mounted implement may be assigned a suitable identification feature that enables the control unit to identify the respective work function and to retrieve the corresponding illumination settings from the memory unit in order to automatically adapt the illumination characteristics of the vehicle headlights. The identification feature consists, in particular, of a digital identification that is determined by the control unit via a data bus when the mounted implement is attached or detached.

In this respect, the illumination settings specified by the driver may alternatively or additionally be characterized by a work function to be carried out with an agricultural implement.

It should be noted that this control system is not limited to use in agricultural utility vehicles. In fact, the inventive control system can also be used in construction or forestry machines or in connection with so-called municipal utility vehicles, i.e., snowplows, road cleaning machines, waste disposal and garbage vehicles or the like.

BRIEF DESCRIPTION OF THE DRAWINGS

The sole FIGURE is a schematic diagram a control system for vehicle headlights.

DETAILED DESCRIPTION OF THE DRAWINGS

Referring to FIG. 1, a control system 10 controls vehicle headlights 12 arranged on agricultural utility vehicle (not shown). The control system includes a navigation device 14 for acquiring geographic location information and a control unit 16 for adapting the illumination characteristics of the vehicle headlights 12 depending on the acquired geographic location information.

With respect to the adaptation of the illumination characteristics, the control unit 16 distinguishes between operation on public roads and operation on non-public roads. The control unit 16 adapts the illumination characteristics in compliance with predefined illumination settings if it determines that the vehicle headlights 12 is being operated on public roads based on the acquired geographic location information. On the other hand, the control unit 16 adapts the illumination characteristics with further consideration of illumination settings specified by the driver if it determines that the vehicle headlights 12 is being operated on non-public roads based on the acquired location information.

The compulsory and insofar predefined illumination settings for the operation on public roads result from pertinent legal stipulations, wherein the road traffic regulations effective in Germany (StVO), as well as the ECE regulations (ECE—Economic Commission for Europe) to be observed with respect to the technical design of the vehicle headlights 12, are particularly important in this context. However, when the driver changes from traffic on public roads to traffic on non-public roads and the control unit 16 detects this change by evaluating the geographic location information acquired by the navigation device 14, the adaptation of the illumination characteristics of the vehicle headlights 12 is no longer subject to such regulations. In fact, the adaptation of the illumination characteristics can take place—exclusively or additionally if so desired by the driver—with further consideration of the illumination settings specified by the driver in this case.

For example, the vehicle headlights 12 shown comprises road lighting 18, field lighting 20 and/or work lighting 22. The road lighting 18, the field lighting 20 and/or the work lighting 22 are formed by several independent headlight groups. The road lighting 18 consists of an arrangement of several front headlights in the front region of a vehicle hood of the agricultural utility vehicle or an arrangement of auxiliary headlights that are arranged offset relative to the front headlights in the roof region of a driver's cab while the field lighting 20 and/or the work lighting 22 comprise a plurality of work lights that are distributed over the outer region of the vehicle body or the drivers cab of the agricultural utility vehicle.

A luminosity control, a light pattern control and/or a light color control are provided in order to adapt the illumination characteristics of the vehicle headlights 12. The vehicle headlights 12 are specifically equipped with conventional halogen, xenon and/or LED lamps used in vehicles, wherein the illumination characteristics of the lamps with respect to luminosity, light distribution and/or light color can be varied by a control element 24 which is actuated by the control unit 16. The control element 24 consists of an electric output regulator, an electrically adjustable screen or mirror arrangement or an actuator for influencing the headlight orientation.

The navigation device 14 features a GPS receiver 26 and a map memory 28, wherein the latter contains digitized road or terrain information. The control unit 16 determines whether the vehicle is being operated on public roads or on non-public roads by matching the geographic location information acquired by means of the GPS receiver 26 or the vehicle position resulting thereof with the road or terrain information contained in the map memory 28.

The predefined illumination settings are characterized by a road type derived from the acquired geographic location information and/or a course of the road that is derived from the acquired geographic location information. If the control unit 16 detects that the headlights 12 are being operated impermissibly with the high beams switched on within a built-up area, for example, based on the road type being driven on, the headlights 12 are automatically dimmed by adapting the illumination characteristics accordingly. This applies similarly to the instance of driving through curves resulting from the current course of the road, wherein the illumination of the road lying ahead automatically follows the curvature of the curve due to a corresponding adaptation of the illumination characteristics.

In addition, an operating device 30 in the form of a touch-sensitive screen is arranged in the driver's cab of the agricultural utility vehicle in order to enable the driver to specify the illumination settings.

The control unit 16 stores the illumination settings specified by the driver in the operating device 30 in a memory unit 34 such as a memory card 32 at the instigation of the driver. The memory card 32 consists of a re-writable flash memory in the form of a conventional Secure Digital Memory Card (SD) that is connected to the control unit 16 via a reversible interface 36 that consist of an electric plug connection in this case. The reversible interface 36 makes it possible to remove the memory card 32 from the control system 10 and to replace the memory card with another memory card. In other words, an individual memory card 32 can be assigned to each driver of the agricultural utility vehicle in order to manage the driver's individual illumination settings.

The illumination settings specified by the driver concern different agriculture-related illumination scenarios, like those that occur, for example, while driving on field paths and farm roads, carrying out loading and unloading tasks on a farmstead, coupling and decoupling mounted implements, carrying out field and forest tasks or the like. For this purpose, the illumination settings specified by the driver for each illumination scenario can be stored in the memory unit 34 by means of the operating device 30 together with a location marker that reflects a vehicle position derived from the acquired geographic location information. When the vehicle (once again) reaches the respective vehicle position, the control unit 16 subsequently retrieves the stored illumination settings from the memory unit 34 automatically—or after prior acknowledgment by the driver—and uses these illumination settings for automatically adapting the illumination characteristics of the vehicle headlights 12. A time marker reflecting a time of day that is specified by the driver and at which the illumination settings specified by the driver should be retrievable is additionally or alternatively stored by means of the operating device 30.

An illumination setting specified for a certain work function of the agricultural utility vehicle can be optionally stored in the memory unit 34. In this case, the work function is linked to the utilization of a certain mounted implement. Accordingly, the mounted implement is assigned a suitable identification feature that enables the control unit 16 to identify the respective work function and to retrieve the corresponding illumination settings from the memory unit 34 in order to automatically adapt the illumination characteristics of the vehicle headlights 12. The identification feature consists of a digital identification that is determined by the control unit 16 via a data bus 38 when the mounted implement is attached or detached.

In other words, the illumination settings specified by the driver are characterized by a position and/or time marker that is set by the driver for desired illumination characteristics and optionally by a work function to be carried cut with an agricultural implement.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A vehicle light control system comprising:
   vehicle headlights mounted on the vehicle;
   a control element for varying orientation and illumination characteristics of the lights;
   a navigation device for acquiring geographic location information;
   an operating device operable by a driver; and
   a control unit connected to the control element, to the navigation device and to the operating device, the control unit storing a first set of predefined illumination settings for public roads, and storing a second set of predefined illumination settings for non-public roads, the control unit causing the operating device to control the illumination characteristics of the lights according to the first set when the navigation device determines that the vehicle is operating on a public road, and, when the navigation device determines that the vehicle is operating on a non-public road, the control unit causing the operating device to control the illumination characteristics of the lights according to a setting selected from the second set in response to operation of the operating device.

2. The control system of claim 1, wherein:
   the vehicle headlights comprises road lighting, field lighting and/or work lighting.

3. The control system of claim 1, wherein:
   the illumination characteristics comprise at least one of the following: luminosity, a light pattern, and a light color.

4. The control system of claim 1, wherein:
   the navigation device comprises a GPS receiver and a map memory.

5. The control system of claim 1, wherein:
   a road type is derived from the acquired geographic location information.

6. The control system of claim 1, wherein:
   the operating device is arranged in a cab of the vehicle to enable the driver to select one of the illumination settings.

7. The control system of claim 1, wherein:
   the control unit stores illumination settings in a memory unit.

8. The control system of claim 1, wherein:
   the second set of illumination settings relate to different agriculture-related illumination scenarios.

9. The control system of claim 1, wherein:
   the second set of illumination settings comprises a position and/or time marker that is set by the driver for desired illumination characteristics.

10. The control system of claim 1, wherein:
    the second set of illumination settings includes an illumination setting related to a work function to be carried out with an agricultural implement.

* * * * *